United States Patent [19]

Alexander

[11] Patent Number: 5,026,242
[45] Date of Patent: Jun. 25, 1991

[54] AUTOMATIC VEHICLE RESTRAINT

[75] Inventor: James C. Alexander, London, Canada

[73] Assignee: Serco Corporation, Ontario, Canada

[21] Appl. No.: 482,476

[22] Filed: Feb. 21, 1990

[51] Int. Cl.⁵ .............................................. B65G 69/00
[52] U.S. Cl. ..................................... 414/401; 14/71.5; 414/584
[58] Field of Search ............ 414/396, 401, 584; 14/69.5, 71.1, 71.5

[56] References Cited

U.S. PATENT DOCUMENTS

| | | | |
|---|---|---|---|
| 656,074 | 8/1900 | Wood | 414/401 |
| 4,127,856 | 11/1978 | Bickel | 414/401 X |
| 4,264,259 | 4/1981 | Hipp | 414/401 |
| 4,472,099 | 9/1984 | Hahn et al. | 414/401 |
| 4,555,211 | 11/1985 | Metz | 414/401 |
| 4,692,755 | 9/1987 | Hahn | 414/401 X |
| 4,695,216 | 9/1987 | Erlandsson | 414/401 |
| 4,887,954 | 12/1989 | Gregerson et al. | 414/401 |

Primary Examiner—David A. Bucci
Attorney, Agent, or Firm—Sughrue, Mion, Zinn, Macpeak & Seas

[57] ABSTRACT

A vehicle restraint for securing a truck to a loading dock. The restraint is actuated by a vehicle ICC bar which moves an arm of the restraint. By use of a cam follower and spring system a restraint member is raised using the motion of the arm to transfer energy to raise the restraint. In the upright position, the restraint captures and prevents a truck from backing away from the dock. The system is held and biased into the engaging position and is released by a mechanical trapping mechanism.

18 Claims, 3 Drawing Sheets

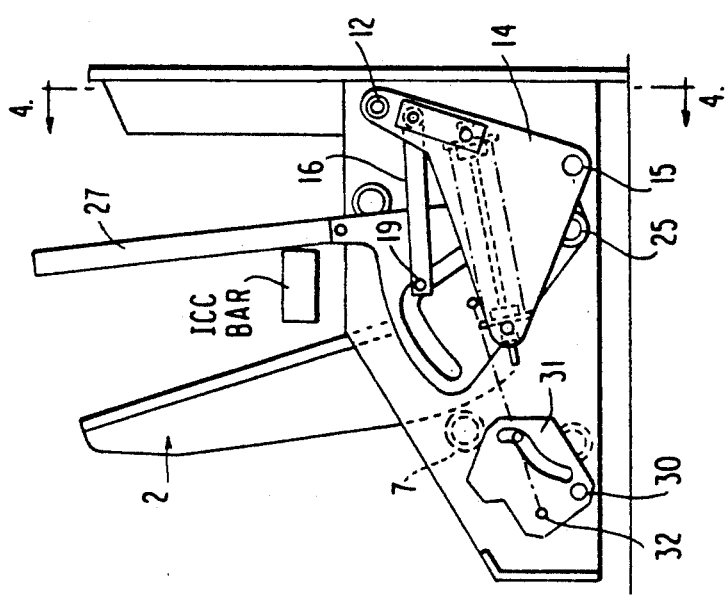
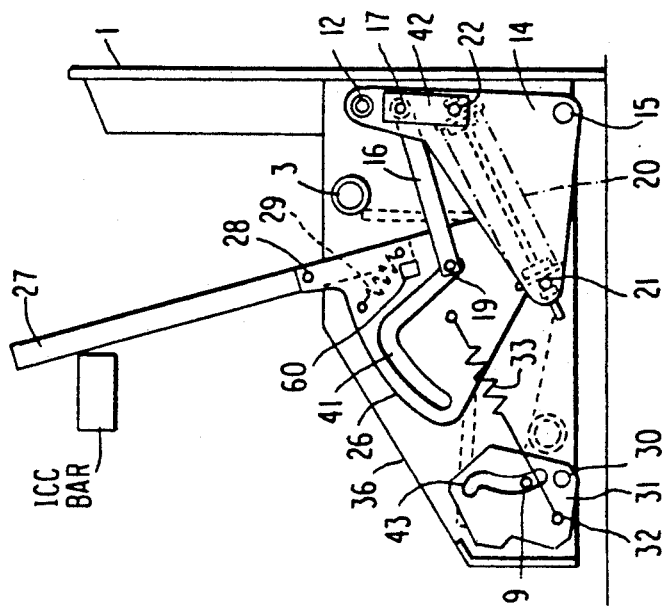
FIG. 2A  FIG. 2B  FIG. 2C

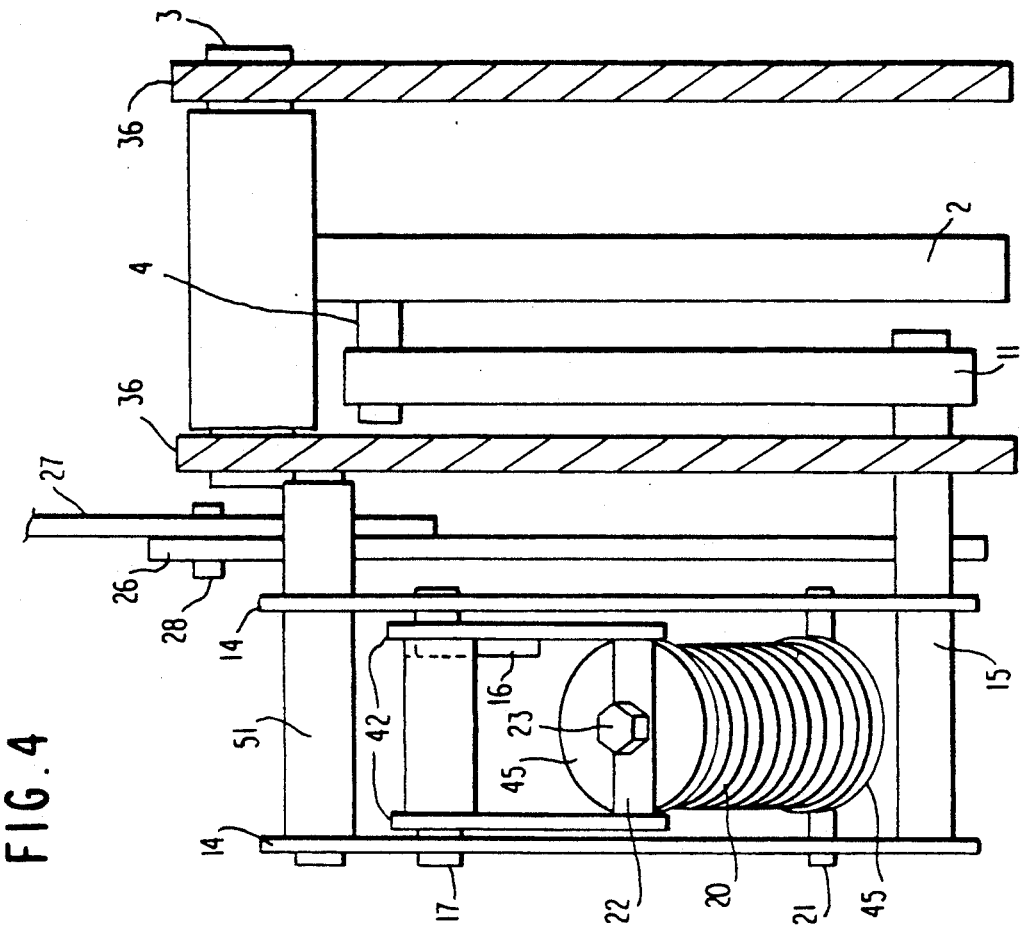
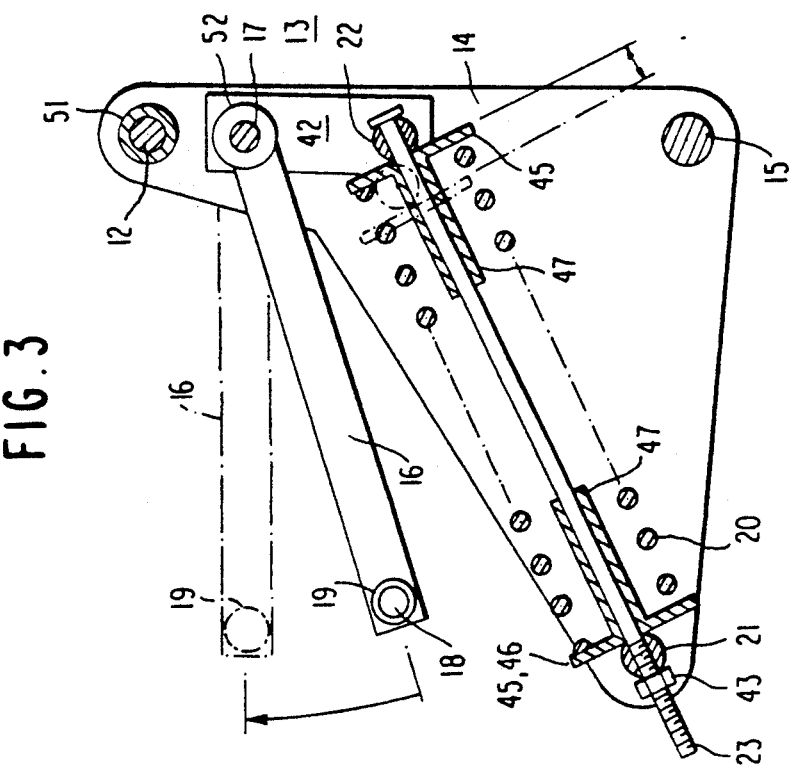

AUTOMATIC VEHICLE RESTRAINT

BACKGROUND OF THE INVENTION

This invention relates to vehicle restraints and, in particular, to devices which hold a truck to a loading dock.

Within the art a number of vehicle restraints have been proposed which act as safety devices to effectively secure a truck in place against the front wall of a loading dock so as to prevent accidental movement of the truck away from the dock while it is being loaded and/or unloaded.

Various techniques of securing the vehicle in place have been utilized. They range from simply chocking the rear wheels of the parked vehicle, the use of chains, or more recently, engaging a mechanical restraint which engages the ICC bar, which is required to be carried on the underside of the vehicle. Each of these techniques has various disadvantages. In the case of vehicle restraints, such fall within two-general categories. A first group are powered and require electrical motors, actuators or hydraulics coupled with electrical controls. Within the patent literature, such electrical or hydraulically operated devices are represented in U.S. Pat. Nos. 4,264,259, 4,282,621, and 4,555,211. These patents are representative of a number of which exist which typify such powered devices. Commercially, they are marketed by Rite-Hite as the ADL Series, by Serco and by Kelley.

A second class of devices are less expensive but usually require a dock attendant to manually engage the lock. The presence of personnel introduces an element of risk to injury during the engaging operation. Such are illustrated, for example, in U.S. Pat. Nos. 4,373,847 and 4,865,508. In some systems, the use of sensors such as a wand, photocells and the like detect the presence of the vehicle ICC bar to initiate action of the motor for purposes of moving the restraint into an operative position. In the case of manual devices, the truck may have to be moved incrementally forward or in reverse to position the ICC bar.

Thus, while the art is replete with a number of techniques and suggestions for vehicles restraints, a need exists for a device which is simple in construction and does not require expensive electrical motors, actuators, hydraulics and the like. Additionally, such a device should preferably be automatically actuated by the truck when the ICC bar has reached a position where it is within the capture range of the device. Moreover, such a device should not require human interaction at the loading dock where there is a high degree of susceptibility to injury.

SUMMARY OF THE INVENTION

Thus, it is an object of this invention to provide a vehicle restraint which effectively overcomes the shortcomings deficiencies associated with prior devices and techniques.

It is a further object of this invention to provide a vehicle restraint which is effective in operation by having a sufficient capture range, it is simple and reliable.

A still further object of this invention is to provide a vehicle restraint which may be placed on a dock approach having a low profile yet providing sufficient capture and holding power to restrain a vehicle while it is being loaded and unloaded.

These and other objects of this invention are accomplished by the use of an automatically operated manual device which activates the restraint upon immediate engagement with the vehicle ICC bar. The device allows for continued engagement as the vehicle is loaded or unloaded without overloading the device. This invention is accomplished by the means of four subsystem components coupled into an operative system.

The first is an operating actuating arm which is engaged by the ICC bar of the truck. This actuating arm transfers force through a cam which moves a cam follower and is then allowed to travel freely beyond the initial engagement position with the ICC bar. The second component is an intermediate mechanism which transfers the motion of the cam follower to the locking arm. This mechanism employs a spring which stores energy so that the cam follower is allowed to move even if the locking arm meets an obstruction. Third is a locking arm that engages the ICC bar of the truck and prevents the vehicle from moving away from the loading dock. Finally, a latch arm engages the locking arm and holds it in a position. The latch arm acts as a force transferring mechanism so that a force placed on the locking arm by truck movement will be not be transferred to either the actuating arm or the intermediate mechanism.

This invention will be described in detail by referring to the attached drawings and the description of the preferred embodiment as follows.

BRIEF DESCRIPTION OF THE DRAWINGS

FIGS. 2A-2C illustrate the sequence of operation of the complete system corresponding to the basic operation illustrated in FIGS. 1A-1C with all of the components illustrated; and FIG. 3 is an illustration of the intermediate mechanism having the spring housing assembly including illustrating deflections of the cam follower showing the degree of spring compression; and FIG. 4 is a sectional view of the device along line 4—4 in FIG. 2B.

DESCRIPTION OF THE PREFERRED EMBODIMENT

Figure 1A:
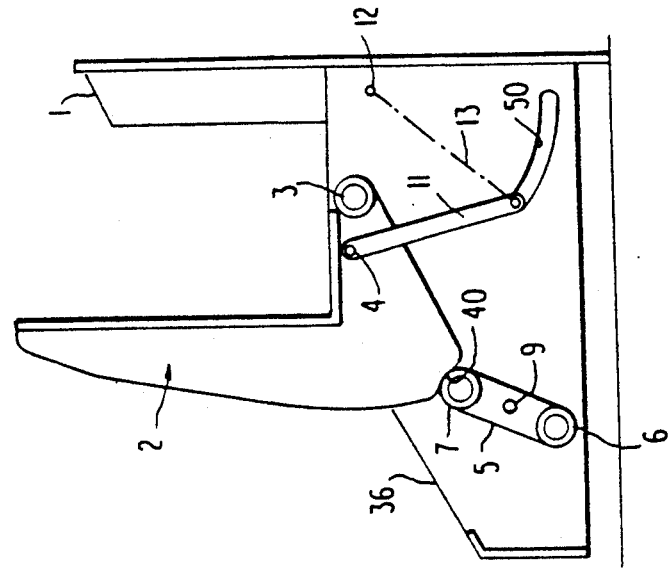
FIGS. 1A-1C illustrate schematically the operation of this device from an inoperative position to an operative position, some components eliminated.
Figure 1B:
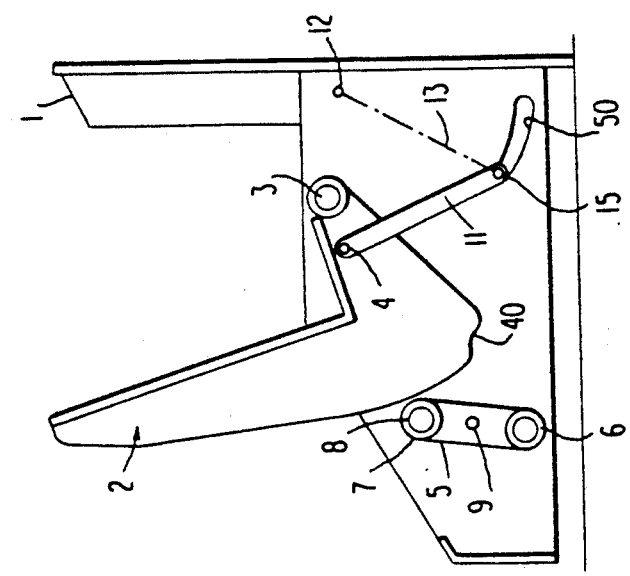
Figure 1C:
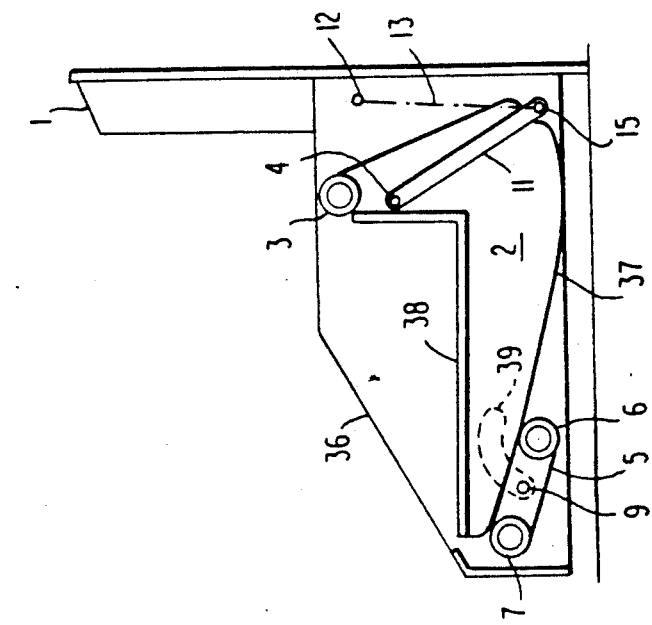

Referring now to FIG. 1A-1B and 1C the basic operation of this device is depicted. The device comprises a welded frame 1, which is mounted in a stationary manner to a dock wall or, alteratively, supported by the driveway. As illustrated in FIG. 1 the frame comprises an upright structure having a flange portion and through-holes for bolting onto the dock face. A housing 36 is used to provide a cover for the components therein.

A lock arm assembly 2 pivots about a pin 3. Pivot pin 3 attaches the locking arm 2 to the frame 1. The lock arm comprises an L-shape portion 37 and a flange portion 38. FIG. 1A illustrates the lock arm in the retracted or inoperative position. FIG. 1B illustrates the device as it is rotated about the pin 3 into an intermediate position, and FIG. 1C illustrates the device in an upright, operative lock position.

A pin 4 mounted on the L-shaped portion 37 of the lock arm 2 attaches one end of a push rod 11 to the lock arm. The other end of the push rod 11 is coupled by a pin 15 to the spring housing 14 (see FIG. 2).

A latch arm 5 is secured to the frame 36 by means of a pivot pin 6. The latch arm rotates about pin 6 as illustrated in FIG. 1 and has at an opposite end a roller 7. The roller 7 is coupled to the latch arm 5 by means of a pivot pin 8. A cam follower roller 9 is attached to the latch arm 5, the cam follower roller engages an opening 39 in the side plate 36 of the frame. As illustrated in FIG. 1, the opening 39 provides a guide for the pin 9 as the roller moves from its restricted position in FIG. 1A to an operative position in FIG. 1C. In FIG. 1C. the roller 7 has engaged a detent 40 in the lock arm assembly to hold the assembly in the upright position and transfer any loading directly from the lock arm 2 to the frame via the latch arm 5.

FIGS. 1A–C schematically illustrates by the chained line 13 a spring housing assembly. This spring housing is held in place by means of a pin 12 in the frame 36. As illustrated in FIG. 1B the opening 50 allows the pin 15 on the spring housing 13 to pass through the side plate 36 to be coupled to the push rod 11. Movement of the push rod 11 is illustrated in FIG. 1 as the latch arm 2 moves from the inoperative position in FIG. 1A to the operative position in FIG. 1C.

Referring now to FIG. 2A–2C and 3, details of the intermediate mechanism are illustrated. The spring housing 13 consists of two side plates 14 attached by pin 15 and bushing 51. The spring housing is held in place by means of pin 12 in the frame 36. Thus, as illustrated in FIG. 2 the housing 14 pivots about the pin 12. The housing carries with it the pin 15 for purposes of moving the push arm 11. A cam follower arm 16 has a cam follower roller 19 secured to one end. The other end is attached to a bushing 52 and two arms 42 (see FIG. 4). This cam follower assembly is fastened to the spring housing assembly by means of pin 17 (see FIG. 3). A pin 18 supports the roller 19 (see FIG. 3) such that the cam follower arm is guided in a cut out 41 in the actuating cam plate 26.

A compression spring 20 is coupled between the cam follower arm assembly and the spring housing assembly 13. That is, one end of the compression spring 20 is attached to the cam follower arm assembly by means of a pin 22 and the other end is coupled to the spring housing 14 by means of a pin 21. The pin 21 is carried in the arms 42 of the cam follower assembly and the pin 22 is carried in the side plates 14 of the spring housing assembly both the pins 21 and 22 have a transverse hole which carries the guide bolt 23. The guide bolt carries two spring guide assemblies 45 which comprises a flange 46 and a sleeve 47. The spring 20 is carried between the spring assemblies.

As illustrated in FIG. 3 a bolt 23 guides the spring and can be tightened by means of an adjusting screw 43, which is threaded onto the bolt 23. This compresses the spring 20 and positions the cam follower roller 19 at the proper position in the cam 41 as illustrated in FIG. 2(a).

An actuating cam assembly having a cam plate 26 is coupled to the frame 36 by means of a pin 25. An actuating arm is mounted to the cam plate 26 by means of a pin 28. A stop leg 60 on the cam plate limits the arm 27 from rotating clockwise relative to the cam plate 26, but the arm is free to rotate counter clockwise. A spring 29 biases the arm 27 against the stop leg 60. Thus, as the ICC bar of a truck is forced against the arm 27 the assembly rotates about the pin 25 as illustrated in FIG. 2. If the ICC bar is very low relative to housing 36 as shown in FIG. 2(C), the top end of the arm 27 will strike the back plate 1 but the pin 28 will allow the cam plate 26 to continue to rotate. The cam plate 26 has a cut therein, cut out 41, which is engaged by the cam follower roller 19 coupled to one end of the cam follower arm 16. A spring 29 having one end mounted to the actuating cam plate 26 and another to the frame 36 holds the actuating arm in an extended position, as illustrated in FIG. 2A. As rotation of the cam plate 26 occurs, the spring 29 is stretched so that there is a restoring force placed on the actuating arm so that it will biased to the position shown in FIG. 2A. A latch cam plate 31 is coupled to the frame 36 by means of a pin 30. A pin 32 on the latch cam 31 is used to attach a spring 33. The other end of the spring 33 is coupled to the actuating cam plate 26 as illustrated in FIG. 2A. FIG. 2A also illustrates the cam follower roller 9, which engages a cut out 43 in the latch cam plate 31.

A latch release arm 34 has a boss 35 thereon which engages the latch arm 5.

The operation of the device of this invention will now be described.

Referring first to FIGS. 1A–1C, sectional views illustrating the locking components are presented. The actuating components, which are added in FIG. 2, are not portrayed. The lock arm 2 pivots about a pin 3 which passes through the side plates 36 of the frame 1. It will be understood that the frame comprises side plates, only one of which is illustrated to house both the lock arm 2 and the actuating components. The locking arm 2 is normally in a retracted position as illustrated in FIG. 1A. Thus, as illustrated in that figure, the overall mechanism has a low height and smooth profile. This is important since it enhances the capture range of the device to take into account variations in ICC bar height and position with respect to the end of the vehicle.

The vehicle restraint is actuated by contact from an ICC bar illustrated in FIG. 2B. The locking arm 2 is raised by the push arm 11, which is attached to pin 4 on lock arm 2 and to pin 15 on the spring housing assembly 13.

The assembly 13 rotates about a pin 12 which is attached in turn to the frame. The spring housing assembly is represented in FIG. 1 by the dash line 13. FIG. 3 shows a detailed section of the spring housing assembly and its components.

FIG. 1A, 1B and 1C illustrate the sequence of positions as a device as actuated from the stored position in FIG. 1A to the raised and operative position in FIG. 1C. A pin 6, which passes through the side plates 36 of the frame 1, carries the latch arm assembly 5. Pin 8, through the latch arm assembly, carries the latch roller 7. A cam follower roller 9 causes the latch arm roller 7 to follow the lock arm 2. When the lock arm 2 is in the fully raised position, illustrated in FIG. 1C. the latch roller moves into a notch 40 at the bottom of a lock arm 2. The latch arm 5 thus acts as a compressive strut holding the locking arm into position. As illustrated in FIG. 1C then, no load can be transferred back to the push rod 13. The ICC bar is trapped behind the lock arm 2 and the truck is restrained from moving away from the dock. As illustrated in FIG. 2, the position of the ICC bar can move vertically relative to the device. This movement, "float" is caused as the vehicle is loaded and/or unloaded and moves on its springs. This is another reason why a low profile is especially important in these devices since it is necessary to have clearance for loaded trucks yet restrain them as the truck is unloaded and "floats" upward.

Referring now to FIG. 2, the device is portrayed in section adding the actuating components. As a vehicle is backed into the dock the ICC bar, labelled in FIG. 2B and FIG. 2C engages the actuating arm 27. The ICC bar is mounted to the back of the truck and is normally in an area within 9 inches in front of the dock bumpers (not illustrated) and from 14 to 30 inches above the ground. As the truck backs in the ICC bar will contact the actuating arm 27 and force it back as illustrated from FIGS. 2A to FIG. 2B. The actuating arm 27 is attached by pin 28 to the actuating cam plate 26. The actuating arm is held in a raised and biased position by means of the spring 29. Thus it translates a load rearward but is free to rotate forward, that is, from the position in FIG. 2B to the position shown in FIG. 2A. This allows the arm to rotate forward relative to the actuating cam plate 26 when it contacts the rear frame portion of the device. The arm is also free to rotate when a force is exerted from the top of the arm such as by a truck being loaded.

Referring now to FIG. 3, a detailed sectional drawing of the spring housing assembly is portrayed. The spring housing 13 rotates about the pin 12 carried on the frame 36. A pin 17 through the housing carries the cam follower arm assembly 16. A pin 18 at the opposite end of the arm 16 carries the cam follower roller 19. When the actuating arm 26 is deflected, the actuating cam plate 26 rotates on pin 25 which is attached to the side portions of the frame 26. As illustrated in FIG. 2A, the cam plate 26 has a cam shaped opening 41 which has a steep actuating portion followed by a dwell portion. Thus, as the actuating cam 26 rotates, the cam follower roller 19 in the cut out 41 is raised from the position shown in FIG. 2A to that in FIG. 2B. The cam follower arm assembly 16 moves with the roller and causes the spring housing 14 to rotate about pin 12. This is also illustrated in the change of position of the housing 14 in FIGS. 2A and 2B. The pin 15 causes the push rod 11, as illustrated in FIG. 1, to raise the lock arm 2.

FIGS. 2A-2C illustrate the latch cam plate 31 rotating about the pin 30. Thus, rotation of the plate 31 occurs relative to the frame 36. The spring 33 is attached to the actuating plate 26 and to the pin 32 on the latch cam plate 31. Rotation of the actuating cam plate 26 thus rotates the latch cam plate 31 which in turn moves the cam follower roller 9. As a consequence of this movement, the latch arm 5 positions the latch roller 7 under the locking arm prevents it from lowering. In this configuration illustrated in FIG. 2C, the ICC bar is trapped between the locking arm and the dock face. The truck is therefore restrained from moving away from the dock.

As mentioned herein, the size and position of the ICC bar can vary on a truck. If given its size or position, such a bar prevents the locking arm 2 from raising, as the actuating arm 27 is deflected, the spring housing can thus not rotate. However, the truck will still move toward the dock face and the ICC bar will force the actuating arm 27 and the cam 26 to rotate. This forces the cam follower roller 19 to raise.

FIG. 3 illustrates that the cam follower arm assembly 16 rotates about the pin 17 and thus, the spring 20 will compress. When the lock arm 2 is free to move, the spring 20 provides the necessary energy to raise it to a vertical position.

FIG. 2C illustrates a condition where the actuating cam is able to rotate beyond the position required to raise the cam follower arm 16. The cam follower roller 19 is then in the dwell portion of the cam opening 41.

Also, in FIG. 2C the actuating arm 27, as illustrated, forced all the way back and rotated forward about pin 28. The actuating cam 26 is still able to rotate since it is in the dwell portion of the cycle.

The device may be retracted from the operative position as follows. A latch releases arm 34 rotates about pin 30. The release arm carries a boss 35 which engages the latch cam plate 31. When the release arm 34 is raised by a chain, or the like not illustrated but shown schematically by the arrow in FIG. 2C, movement of the latch cam 31 occurs. This displaces the latch roller 7 away from the detent 40 in the lock arm. The truck is free to drive away, and in turn, the bar 2 is retracted.

Although not illustrated, a limit switch or the like may be used to detect the position of the release arm. The switch could also control indicator lights which are required to display the status of the lock to the dock attendant and the truck driver.

Other modifications may be practiced within the scope of this invention.

I claim:

1. A device for restraining a vehicle comprising:
a frame rigidly mounted to a surface,
an arm pivotably mounted to said frame and projecting from said frame to engage said vehicle and move in response to vehicle movement,
a first cam plate coupled to said arm and movable in response to movement of said arm, said first cam plate having a cam surface, a cam follower in operative engagement with said cam surface,
a locking arm pivotably mounted to said frame, said locking arm movable from a retracted inoperative position to an operative position where it prevents vehicle movement, and
means responsive to motion of said cam follower for moving said locking arm from said inoperative position to said operative position.

2. The device of claim 1 wherein said means for moving said locking arm comprises resilient means for positioning said cam follower and a push rod coupled between said locking arm and said resilient means, said resilient means and said push rod coupled to a common member movable in response to movement of said cam follower.

3. The device of claim 2 wherein said resilient means comprises a compression spring permitting movement of said cam follower after said locking arm has reached an operative position.

4. The device of claim 1 further comprising a latch arm movable in response to movement of said first cam plate, said latch arm engaging said locking arm and holding it in said operative position.

5. The device of claim 4 further comprising a second cam plate, means coupling said first cam plate to said second cam plate, a cam follower roller attached to said latch arm and engaging said second cam plate whereby movement of said second cam plate is converted into pivotable movement of said latch arm.

6. The device of claim 5 further comprising a guide slot in said frame, said cam follower roller also engaging said guide slot.

7. The device of claim 5 further comprising a detent in said locking arm, a roller on one end of said latch arm in contact with said locking arm and engaging said detent when said locking arm is in said operative position.

8. The device of claim 5 further comprising a release arm to disengage said latch arm from said locking arm.

9. The device of claim 1 wherein said cam surface comprises a cam cut-out, said cam cut-out engaged by a roller on one end of said cam follower, said cut-out having an actuating portion and a dwell portion.

10. A device for restraining a vehicle comprising:
a frame rigidly mounted to a surface,
movable means pivotably mounted to said frame and projecting from said frame for touching part of said vehicle and moving in response to vehicle movement,
a first cam plate having a cam surface, said first cam plate coupled to said arm and movable in response to movement of said movable means, a cam follower in operative engagement with said cam surface,
an arm pivotably mounted to said frame, said arm movable from a retracted inoperative position to an operative position where it prevents vehicle movement, and
means responsive to motion of said cam follower for moving said arm from said inoperative position to said operative position.

11. The device of claim 10 wherein said means for moving said arm comprises resilient means for positioning said cam follower and a push rod coupled between said arm and said resilient means, said resilient means and said push rod coupled to a common member movable in response to movement of said cam follower.

12. The device of claim 11 wherein said resilient means comprises and adjustable compression spring permitting movement of said cam follower after said arm has reached an operative position.

13. The device of claim 10 further comprising a latch arm movable in response to movement of said first cam plate, said latch arm engaging said arm and holding it in said operative position.

14. The device of claim 13 further comprising a second cam plate, means coupling said first cam plate to said second cam plate, a cam follower roller attached to said latch arm and engaging said second cam plate whereby movement of said second cam plate is converted into pivotable movement of said latch arm.

15. The device of claim 14 further comprising a guide slot in said frame, said cam follower roller also engaging said guide slot.

16. The device of claim 14 further comprising a detent in said arm, a roller on one end of said latch arm in contact with said arm and engaging said detent when said locking arm is in said operative position.

17. The device of claim 14 further comprising a release arm to disengage said latch arm from said arm.

18. The device of claim 1 wherein said cam surface comprises a cam cut-out, said cam cut-out engaged by a roller on one end of said cam follower, said cut-out having an actuating portion and a dwell portion.

* * * * *